US009547106B2

(12) United States Patent
Lee et al.

(10) Patent No.: US 9,547,106 B2
(45) Date of Patent: Jan. 17, 2017

(54) ELECTRONIC BUCKET-TYPE PRECIPITATION METER

(71) Applicant: DAEYANG INSTRUMENT CO.,LTD., Busan (KR)

(72) Inventors: Seon Gil Lee, Busan (KR); Taek Sik Jeong, Busan (KR); Kyung Won Kim, Changwon-si (KR)

(73) Assignee: DAEYANG INSTRUMENT CO., LTD., Busan (KR)

( * ) Notice: Subject to any disclaimer, the term of this patent is extended or adjusted under 35 U.S.C. 154(b) by 60 days.

(21) Appl. No.: 14/441,855

(22) PCT Filed: Oct. 4, 2013

(86) PCT No.: PCT/KR2013/008896
§ 371 (c)(1),
(2) Date: May 11, 2015

(87) PCT Pub. No.: WO2014/077511
PCT Pub. Date: May 22, 2014

(65) Prior Publication Data
US 2015/0293263 A1    Oct. 15, 2015

(30) Foreign Application Priority Data

Nov. 14, 2012  (KR) .......................... 10-2012-0129032

(51) Int. Cl.
*G01W 1/14*    (2006.01)
(52) U.S. Cl.
CPC ..................... *G01W 1/14* (2013.01)

(58) Field of Classification Search
USPC ........................................... 73/170.21; 702/3
See application file for complete search history.

(56) References Cited

U.S. PATENT DOCUMENTS

2008/0184788 A1    8/2008   Jeong et al.

FOREIGN PATENT DOCUMENTS

| JP | 6027872 B2 | 4/1994 |
| KR | 10-2008-0073557 A | 8/2008 |
| KR | 10-0947450 B1 | 3/2010 |
| KR | 10-0973789 B1 | 8/2010 |

OTHER PUBLICATIONS

International Search Report for PCT/KR2013/008896 mailed Feb. 10, 2014 from Korean Intellectual Property Office.

*Primary Examiner* — Michael A Lyons
*Assistant Examiner* — Jean Morello
(74) *Attorney, Agent, or Firm* — Revolution IP, PLLC

(57) ABSTRACT

Disclosed is an electronic bucket-type precipitation meter including: an inclined bucket which extends at an angle from one edge to the center so as to collect rainwater; a measurement bucket which extends downward so that the rainwater is collected at the center of the inclined bucket, wherein a measurement unit is installed on a side surface thereof so as to measure the collected rainwater; a covering part in which the upper covering part is formed at the upper part thereof and has an inclined contact surface having the same incline as the inclined bucket, and in which the lower covering part is formed at the lower part thereof so as to block the bottom surface of the measurement bucket; and a lifting and lowering driving unit which lifts and lowers the cover part.

3 Claims, 4 Drawing Sheets

ELECTRONIC BUCKET-TYPE PRECIPITATION METER

CROSS REFERENCE TO PRIOR APPLICATIONS

This application is a National Stage Application of PCT International Patent Application No. PCT/KR2013/008896 filed on Oct. 4, 2013, under 35 U.S.C. §371, which claims priority to Korean Patent Application No. 10-2012-0129032 filed on Nov. 14, 2012, which are all hereby incorporated by reference in their entirety.

FIELD OF THE INVENTION

The present invention relates to an electronic bucket-type precipitation meter and, most particularly, the present invention relates to an electronic bucket-type precipitation meter having a low fabrication cost, being light-weight, and being easy to use, which has an outstanding resolving power and excellent precision, which is capable of performing accurate measurement due to the absence of any precipitation measurement error caused by wind, wherein such error corresponds to one of the most critical problems of the turnover-type precipitation meter, and which has a smaller number of assembly parts and undergoes less failure as compared to the weight-type precipitation meter, by electronically and accurately measuring a level of precipitation through a fixed measurement bucket by using two covering parts for measurement and drainage, each being connected to one another by being placed one above the other.

BACKGROUND ART

Precipitation refers to a meteorological phenomenon occurring within the atmosphere, and the level of precipitation is very closely related to the everyday lives of human beings.

Recently, due to the influence of global warming, diverse types of pollution, and environmental contamination, and so on, unexpected rainstorm (or heavy rain) or super typhoon, wind gust, and so on, have become active very suddenly, and, therefore, accurate precipitation measurement is very crucial, and, most particularly, there should be no measurement error in measuring precipitation including wind gust.

Generally, in order to measure precipitation, as shown in FIG. 1, a mechanical bucket-type turnover-type precipitation meter is being used.

In the turnover-type precipitation meter, when a predetermined amount of precipitation is collected in one side of a bucket (1) having the structure of a see-saw, due to its weight, the bucket (1) is tilted to the other side and activates a switch (2), so as to generate a contact signal, and the signal is then converted to a precipitation level.

However, such turnover-type precipitation meters are installed outdoors being exposed to wind, and, accordingly, when the wind blows, malfunction occurs frequently, and, additionally, even when there is no rainfall, in such turnover-type precipitation meter, when wind is introduced through its drainage hole, the see-saw shaped bucket (1) is tilted and activates the switch (2), which frequently leads to precipitation measurement errors indicating rainfall even when there is no rainfall.

The weight-type precipitation meter shown in FIG. 2 corresponds to a precipitation meter that can convert precipitation weight within an instrumentation tank (4) placed above a load cell (3) by using the load cell (3), which is configured to measure weight, and the weight-type precipitation meter is disadvantageous in that precision assembly parts are used, thereby causing the structure to become complicated, causing frequent minor malfunction and failure, and causing an increase in the fabrication cost.

Moreover, precipitation measurement error also occurs in the weight-type precipitation meter when a load applied to the load cell is changed due to wind pressure, which is caused by the wind.

Furthermore, in order to measure a precipitation height per unit area, although the precipitation measurement reference standard is required to convert the precipitation height by measuring a volume of the precipitation, instead of measuring the volume, since both of the above-described turnover-type precipitation meter and the weight-type precipitation meter can convert the precipitation height by measuring the weight, there is a problem of failing to compensate for volumetric difference respective to temperature. In other words, when described more specifically, although precipitation is to be measured by measuring its volume, evidently, since the weight of water varies depending upon the temperature of the water, and, more specifically, since the water weighs the most at 3.98° C., and since its weight decreases gradually at a temperature higher than this, and since the level of precipitation is measured by weight despite such difference in weight, which is caused by the difference in temperature, there lies a problem in that the measurement of the level of precipitation cannot be performed accurately.

DETAILED DESCRIPTION OF THE INVENTION

Technical Objects

In order to resolve such problems, an object of the present invention is to provide an electronic bucket-type precipitation meter that is capable of being installed at a low cost and capable of being operated with high precision, by electronically and accurately measuring a level of precipitation through a predetermined volume in a fixed measurement bucket by using two upper and lower covering parts, each being connected to one another by being placed one above the other, and that is also capable of being fabricated in a simple structure that can resolve the problem of precipitation measurement error, which is caused by wind, by using a fixed measurement electronic bucket Another object of the present invention is to provide an electronic bucket-type precipitation meter that is capable of accurately measuring precipitation levels through volume by resolving the problem of failing to compensate for a volumetric difference of the water respective to temperature, wherein the volumetric difference is caused by the related art turnover-type precipitation meter and the related art weight-type precipitation meter in which the precipitation weight is measured and then converted to the precipitation height.

Technical Solutions

Such object of the present invention may be achieved by the electronic bucket-type precipitation meter according to the present invention, wherein the electronic bucket-type precipitation meter includes a water receiving opening which extends at an angle from one edge to the center so as to collect rainwater, a measurement bucket which extends downward so that the rainwater is collected at the center of the water receiving opening, wherein a probe is installed on a side surface thereof so as to measure the collected rainwater, a covering part in which the upper covering part is formed at the upper part thereof and has an inclined contact surface having the same inclination as the water receiving opening, and in which the lower covering part is formed at the lower part thereof so as to block the bottom surface of the measurement bucket, a lifting and lowering driving unit which lifts and lowers the covering part.

Effects of the Invention

According to the present invention, the electronic bucket-type precipitation meter has the following advantages. Herein, the electronic bucket-type precipitation meter includes an inclined bucket which extends at an angle from one edge to the center so as to collect rainwater, a measurement bucket which extends downward so that the rainwater is collected at the center of the inclined bucket, wherein a measurement unit is installed on a side surface thereof so as to measure the collected rainwater, a covering part in which the upper covering part is formed at the upper part thereof and has an inclined contact surface having the same incline as the inclined bucket, and in which the lower covering part is formed at the lower part thereof so as to block the bottom surface of the measurement bucket, and a lifting and lowering driving unit which lifts and lowers the covering part. Precipitation in the measurement bucket at a predetermined volume is electronically and accurately measured so that the precipitation can be measured accurately. In addition, the fixed measurement bucket is used to address the problem of precipitation measurement errors caused by wind. Further, the present invention can be manufactured to have a simple structure, can be installed at low cost, and can allow high precision measurement. Furthermore, one problem of turn-over-type precipitation meters and weight-type precipitation meters of the related art, namely, converting the precipitation height through weight measurements and not compensating for the temperature-based volume variations of the water, is solved so that an accurate precipitation volume is measured, the precipitation height is converted, the temperature-based volume variation of the water is not generated, and the precipitation can be measured accurately.

BEST MODE FOR CARRYING OUT THE PRESENT INVENTION

Figure 1A:
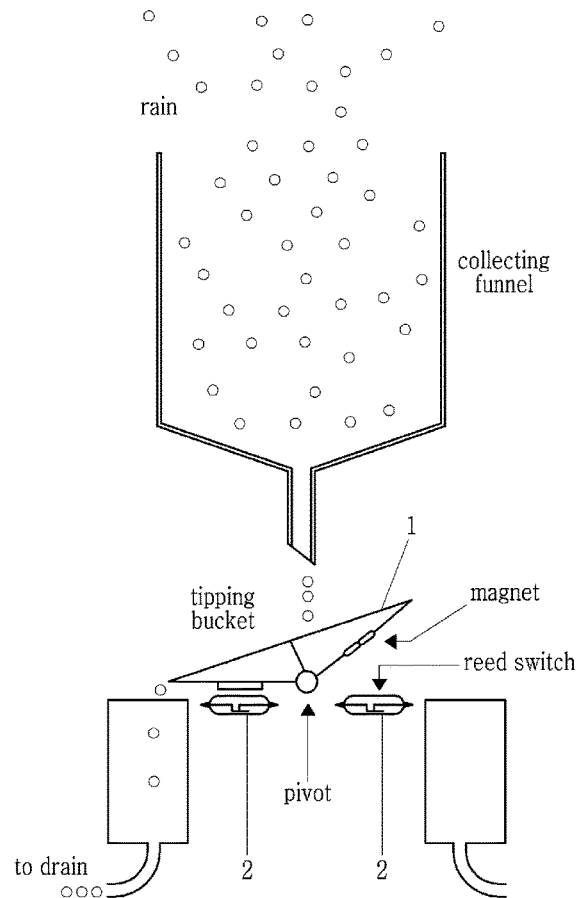
FIGS. 1a and 1b illustrate a general cross-sectional view diagram and a perspective view image of the related art turnover-type precipitation meter.
Figure 1B:
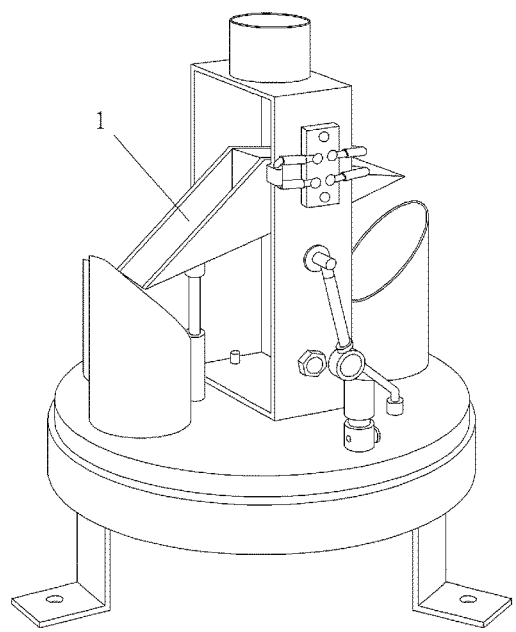
Figure 2A:
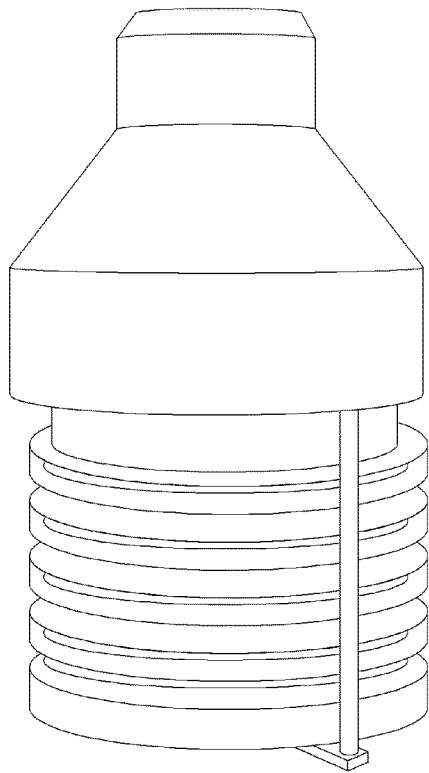
FIGS. 2a and 2b illustrate a general cross-sectional view diagram and a perspective view image of the related art weight-type precipitation meter.
Figure 2B:
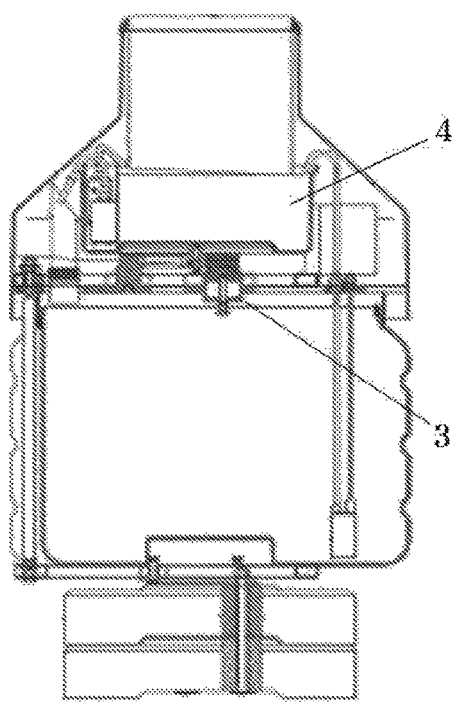
Figure 3:
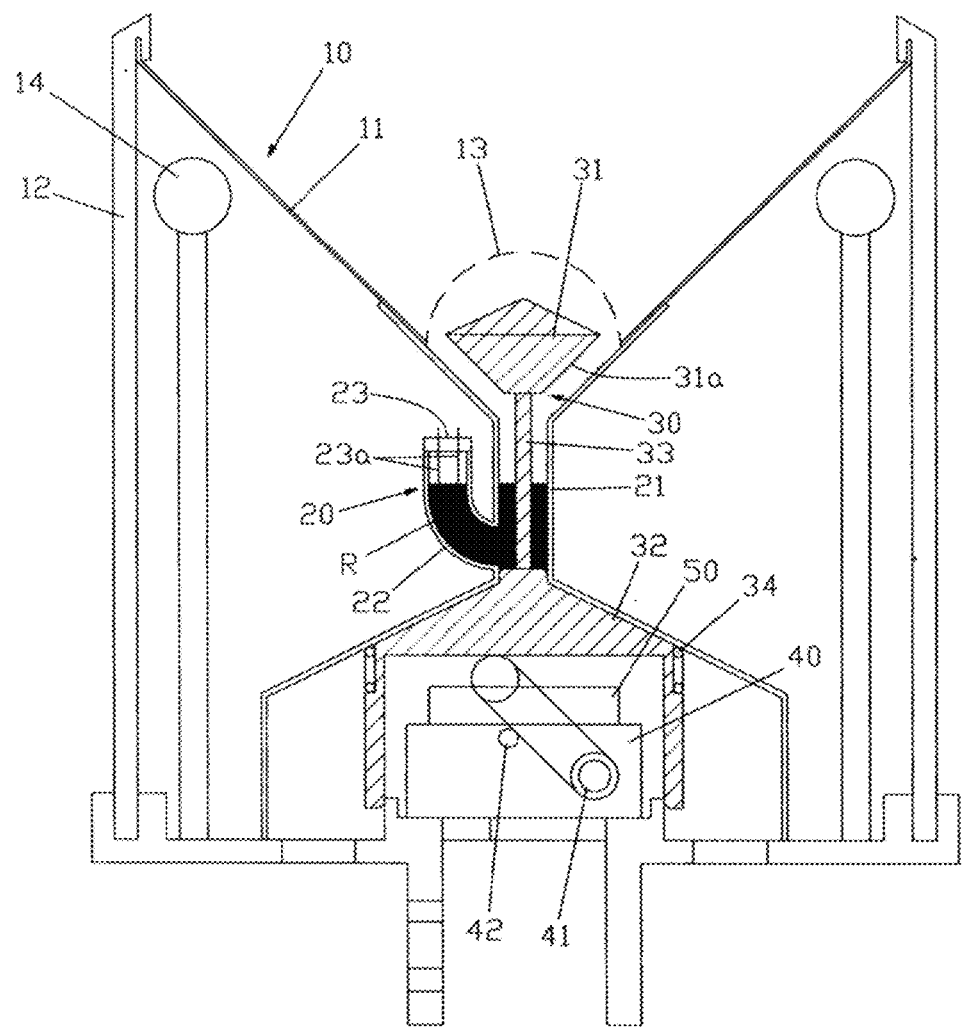
FIG. 3 illustrates a cross-sectional view diagram of an electronic bucket-type precipitation meter according to a first exemplary embodiment of the present invention when performing a precipitation measurement.

As shown in FIG. 3, an electronic bucket-type precipitation meter (A) includes a water receiving opening (10) which extends at an angle from one edge to the center so as to collect rainwater, a measurement bucket (20) which extends downward so that the rainwater is collected at the center of the water receiving opening (10), wherein a probe unit (23) is installed on a side surface thereof so as to measure the collected rainwater, a covering part (30) in which the upper covering part is formed at the upper part thereof and has an inclined contact surface having the same inclination as the water receiving opening (10), and in which the lower covering part (30) is formed at the lower part thereof so as to block the bottom surface of the measurement bucket, a lifting and lowering driving unit (40) which lifts and lowers the covering part, and a controller (50) which lifts and lowers the lifting and lowering driving unit (40) and which calculates rainwater measured by the probe unit (23).

The water receiving opening (10) includes an inclined part (11) which is formed to be inclined at an angle from one edge to the center, and a support unit (12) which supports the inclined part (11) at the edge.

It is preferable that the water receiving opening (10) is fabricated (or manufactured) to have a circular shape in order to have the same measurement condition in all directions, and, in order to accurately differentiate the precipitation measurement surface area, the upper portion of the support unit (12) of the water receiving opening (10) should be treated and processed to have an inclined edge.

The inclined part (11) shall maintain an angle of 45 degrees or more from the bottom surface in order to prevent the collected rainwater from splashing (or bouncing) outside of the water collecting body, and, by having the support unit (11) form a raised part on the upper portion of the inclined part (11), this performs the function of preventing the rainwater from splashing (or bouncing) to the outside.

A filter (13), which is configured to filter out foreign substances being introduced along with the rainwater, is installed at the center of the inclined part (11).

A heater (14), which is configured to have a circular shape, is formed at the lower portion of the inclined part (11), wherein the heater (14) is installed to allow the inclined part (11) to maintain ordinary temperature (or room temperature), thereby preventing the rainwater from freezing.

The measurement bucket (20) includes an extended main body part (21) which is formed on a lower portion of an inclined part (11) and which extends downward where the rainwater is collected, a measurement extension pipe (22) which is formed to extend upward in a round shape starting from a lower portion of the extended main body part (21), and a probe unit (23) which is secured to an upper part of the measurement extension pipe (22) and which measures the height of the precipitation (or rainwater) collected in the measurement extension pipe (22) and delivers the measured height to the controller (50).

The probe unit (23) generates a contact signal with two probes (23a) by using the conductive property of water and, then, lifts and lowers the lifting and lowering driving unit (40).

The covering part (30) is configured to have the upper covering part (31) formed at the upper part thereof and having the inclined contact surface (31a) having the same inclination as the inclined part (11) of the water receiving opening (10), and to have the lower covering part (32) formed at the lower part thereof so as to block a bottom surface of the extended main body part (21) of the measurement bucket (20), and to have the upper covering part (31) and the lower covering part (32) connected to one another by a connection pole (33).

The lower covering part (32) is elastically supported downward by a spring (34).

The lifting and lowering driving unit (40), which lifts and lowers the covering part (30), is equipped with a motor driving unit (41), which instantaneously lifts and lowers the covering part (30). Although a stepping motor is used as the motor driving unit (41) in the exemplary embodiment of the present invention will not be limited only to this, and it will be understood that all driving units that can lift and lower the covering part (30) should be included, and, for example, a hydraulic cylinder may also be installed at the bottom surface of the covering part (30). Accordingly, the position of the covering unit (30) is detected by a position sensor (42), which is installed to be adjacent to the motor driving unit (41).

The controller (50) performs lifting and lowering driving of the lifting and lowering driving unit (40) and, then, calculates the rainwater which is measured by the probe unit (23) and transmits the calculation to the outside, or records or stores the calculated precipitation level.

The operation of the electronic bucket-type precipitation meter (A) according to the present invention, which has the above-described structure, will hereinafter be described. First of all, in case of a rainfall, when raindrops are introduced inside the water receiving opening (10), the raindrops run down the inclined part (11) toward the center and are collected inside the extended main body part (21) of the measurement bucket (20). In this state, as shown in black in FIG. 3, since the lower portion of the extended main body part (21) is blocked by the lower covering part (32), the rainwater (R) is collected inside the extended main body part (21), and since the lower portion of the extended main body part (21) is interconnected with the measurement extension pipe (22), the collected rainwater (R) flows into the measurement extension pipe (22), and, as described above, at the moment the rainwater (R), which is flown into the measurement extension pipe (22), contacts the probe (23a) of the probe unit (23), electric current is applied to the two probes (23a), thereby generating a contact signal, and this contact signal is transmitted to the controller (50), and, subsequently, the controller (50) transmits a command that lowers the lifting and lowering driving unit (40), and, then, the motor driving unit (41) of the lifting and lowering driving unit (40) is operated, thereby lowering the covering unit (30).

Figure 4:
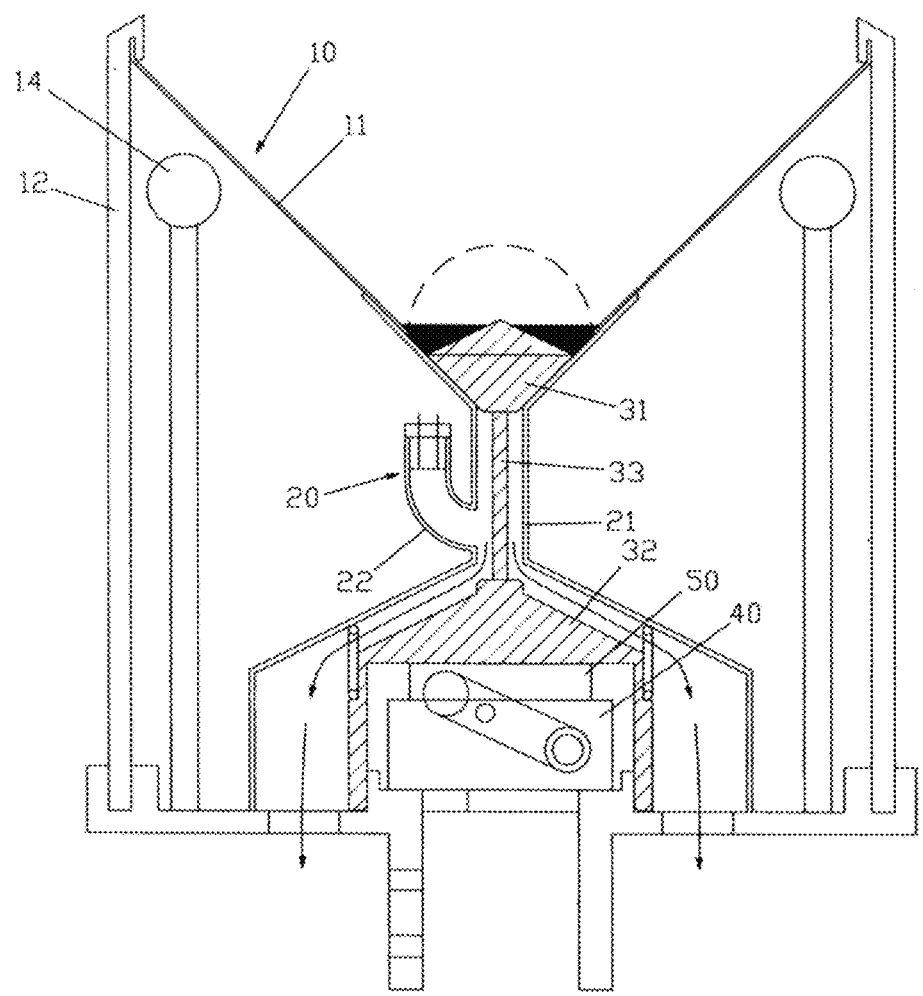
FIG. 4 illustrates a cross-sectional view diagram of a drainage state of the electronic bucket-type precipitation meter shown in FIG. 3.

As described above, when the covering unit (30) is lowered, the precipitation, which was measured in the closed (or blocked) state due to the lower covering part (32), is leaked to the lower portion, as shown in FIG. 4, and, at the same time, the rainwater (R), which runs down the inclined part (11), as the inclined contact surface (31a) of the upper covering part (31) contacts the inclined part (11), is contained in the upper portion of the upper covering part (31).

Accordingly, the amount of rainwater (R) shown in FIG. 3 is measured, and, by repeating the above-described process, the measurement of a level of precipitation per hour or a level of precipitation per day becomes possible, and, since the structure of the electronic bucket-type precipitation meter (A) according to the present invention becomes remarkably simple, thereby significantly reducing the fabrication cost, and, since the level of precipitation can be accurately measured through volume, error is eliminated, thereby enabling precise measurement of a 0.1 mm-level precision amount to be performed, and, since the concern for malfunction caused by wind is eliminated, the present invention may be installed without any limitation in place, thereby allowing the installation of the present invention to become more convenient.

As described above, the electronic bucket-type precipitation meter according to the present invention is configured to have a simple structure, which blocks rainwater or allows rainwater to pass through by using two upper and lower covering parts each being connected to one another by being placed one above the other, and by generating a contact signal with two probes by using the conductive property of water and by operating the lifting and lowering driving unit accordingly, the level of precipitation may be accurately and precisely measured based upon its volume, and, additionally, the present invention may be fabricated in a simple structure while perfectly resolving the problem of precipitation measurement errors, which occur due to wind, by using a fixed bucket that does not move. Thus, a 0.1 mm level precision precipitation meter that can be installed at a low cost may be provided.

INDUSTRIAL APPLICABILITY

Since the same product can be repeatedly fabricated in the fabrication industry of general precipitation meters, the electronic bucket-type precipitation meter according to the present invention corresponds to an industrially applicable invention.

What is claimed is:

1. As an electronic bucket-type precipitation meter (A), the electronic bucket-type precipitation meter (A) comprises:
    a water receiving opening (10) which extends at an angle from one edge to the center so as to collect rainwater;
    a measurement bucket (20) which extends downward so that the rainwater is collected at the center of the water receiving opening (10), wherein a probe unit (23) is installed on a side surface thereof so as to measure the collected rainwater;
    a covering part (30) in which an upper covering part is formed at an upper part thereof and has an inclined contact surface having a same inclination as the water receiving opening (10), and in which a lower covering part (30) is formed at a lower part thereof so as to block a bottom surface of the measurement bucket;
    a lifting and lowering driving unit (40) which lifts and lowers the covering part; and
    a controller (50) which lifts and lowers the lifting and lowering driving unit (40) and which calculates rainwater measured by the probe unit (23).

2. The electronic bucket-type precipitation meter of claim 1, wherein the measurement bucket (20) comprises:
    an extended main body part (21) which is formed on a lower portion of an inclined part (11) and which extends downward where the rainwater is collected;
    a measurement extension pipe (22) which is formed to extend upward in a round shape starting from a lower portion of the extended main body part (21); and
    a probe unit (23) which is secured to an upper part of the measurement extension pipe (22) and which measures the height of the precipitation collected in the measurement extension pipe (22) and delivers the measured height to the controller (50).

3. The electronic bucket-type precipitation meter of claim 1, wherein the covering part (30) is configured to have the upper covering part (31) formed at the upper part thereof and having the inclined contact surface (31a) having the same inclination as the inclined part (11) of the water receiving opening (10), and to have the lower covering part (32) formed at the lower part thereof so as to block a bottom surface of the extended main body part (21) of the measurement bucket (20), and to have the upper covering part (31) and the lower covering part (32) connected to one another by a connection pole (33).

\* \* \* \* \*